United States Patent
Yang et al.

(10) Patent No.: US 9,607,642 B1
(45) Date of Patent: Mar. 28, 2017

(54) HEAD-MEDIUM CONTACT DETECTION USING A THERMAL SENSOR AND SURFACE CHARGE CONTROL OF A SLIDER

(71) Applicant: Seagate Technology LLC, Cupertino, CA (US)

(72) Inventors: Won Choul Yang, Kowloon (HK); Jin Pil Kim, Sai Wan Ho (HK); Shi Jung Kim, Yongin (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/007,728

(22) Filed: Jan. 27, 2016

(51) Int. Cl.
*G11B 5/60* (2006.01)

(52) U.S. Cl.
CPC ............ *G11B 5/6076* (2013.01); *G11B 5/607* (2013.01); *G11B 5/6035* (2013.01)

(58) Field of Classification Search
None
See application file for complete search history.

(56) References Cited

U.S. PATENT DOCUMENTS

| | | | |
|---|---|---|---|
| 3,789,234 A | 1/1974 | Watanabe et al. | |
| 4,005,358 A | 1/1977 | Foner | |
| 5,365,787 A | 11/1994 | Hernandez et al. | |
| 7,016,139 B2 | 3/2006 | Baumgart et al. | |
| 7,233,451 B2 | 6/2007 | Baumgart et al. | |
| 7,405,896 B2 | 7/2008 | Hirano et al. | |
| 7,573,668 B2 | 8/2009 | Kwon et al. | |
| 7,660,068 B1 | 2/2010 | Baumgart et al. | |
| 8,049,984 B2 | 11/2011 | Contreras et al. | |
| 8,102,181 B2 | 1/2012 | Redko et al. | |
| 8,630,057 B2 | 1/2014 | Murthy et al. | |
| 8,848,309 B2 | 9/2014 | Budde | |
| 8,995,076 B1 * | 3/2015 | Olson et al. | G11B 5/596 360/39 |
| 9,245,561 B1 | 1/2016 | Lee et al. | |
| 2014/0240871 A1 | 8/2014 | Canchi et al. | |

* cited by examiner

*Primary Examiner* — Craig A. Renner
(74) *Attorney, Agent, or Firm* — Hollingsworth Davis, LLC

(57) ABSTRACT

An AC signal having a specified frequency and a DC offset voltage is applied to a slider substrate or a magnetic recording medium. A low- or non-modulation interface is defined between the slider and medium. In response to applying the AC signal, an oscillation in an electrostatic force occurs between the slider and the medium at the specified frequency, which causes an oscillation in thermal sensor signal at the slider, which oscillates at the specified frequency. A heater of the slider is adjusted to decrease spacing between the slider and medium during oscillation of the electrostatic force. For each heater adjustment, thermal sensor resistance is measured over a specified number of medium revolutions. Head-medium contact is detected using one of an amplitude of a harmonic of the thermal sensor signal and a summation of amplitudes of all frequency components at the specified frequency.

21 Claims, 11 Drawing Sheets

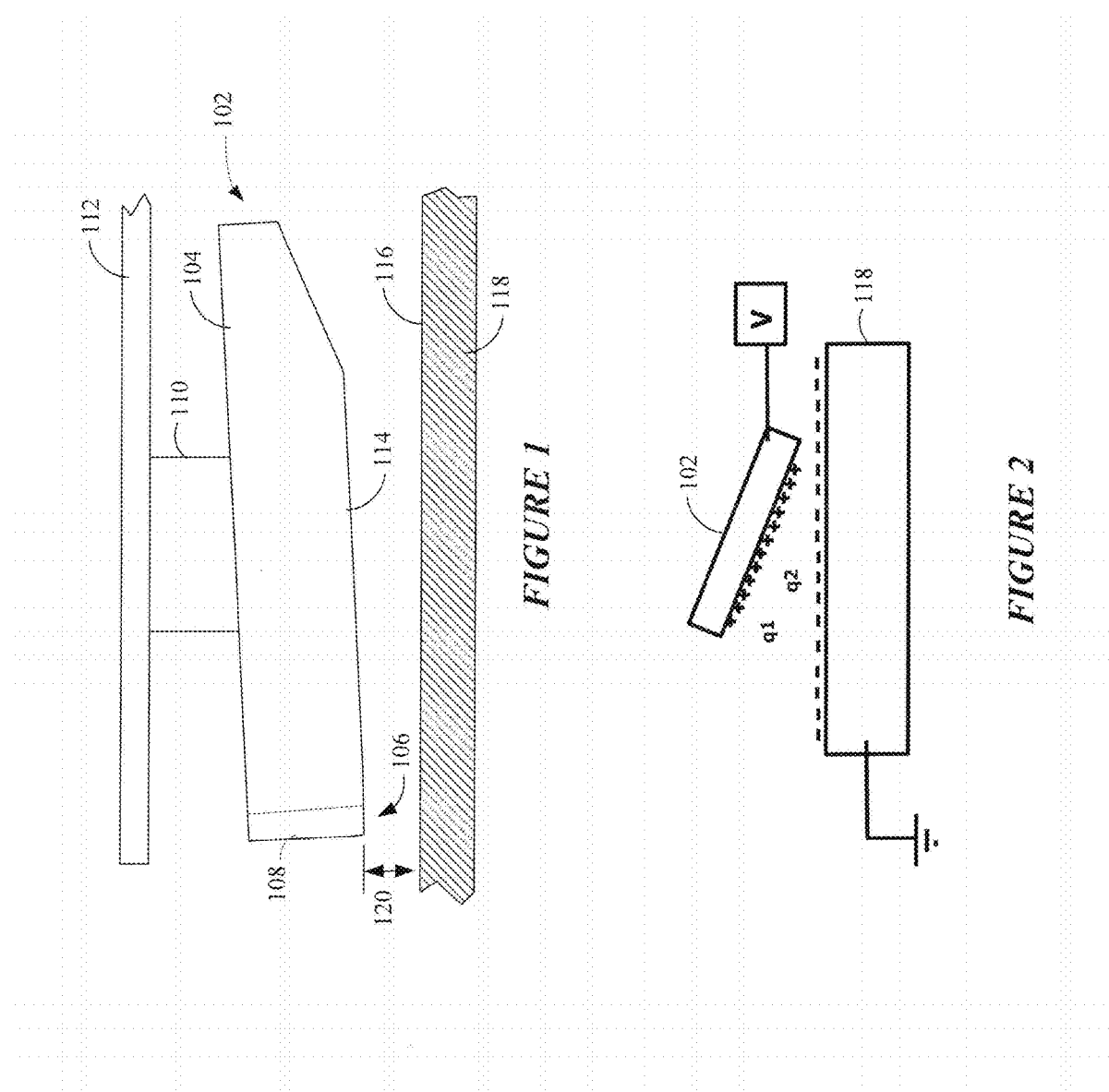

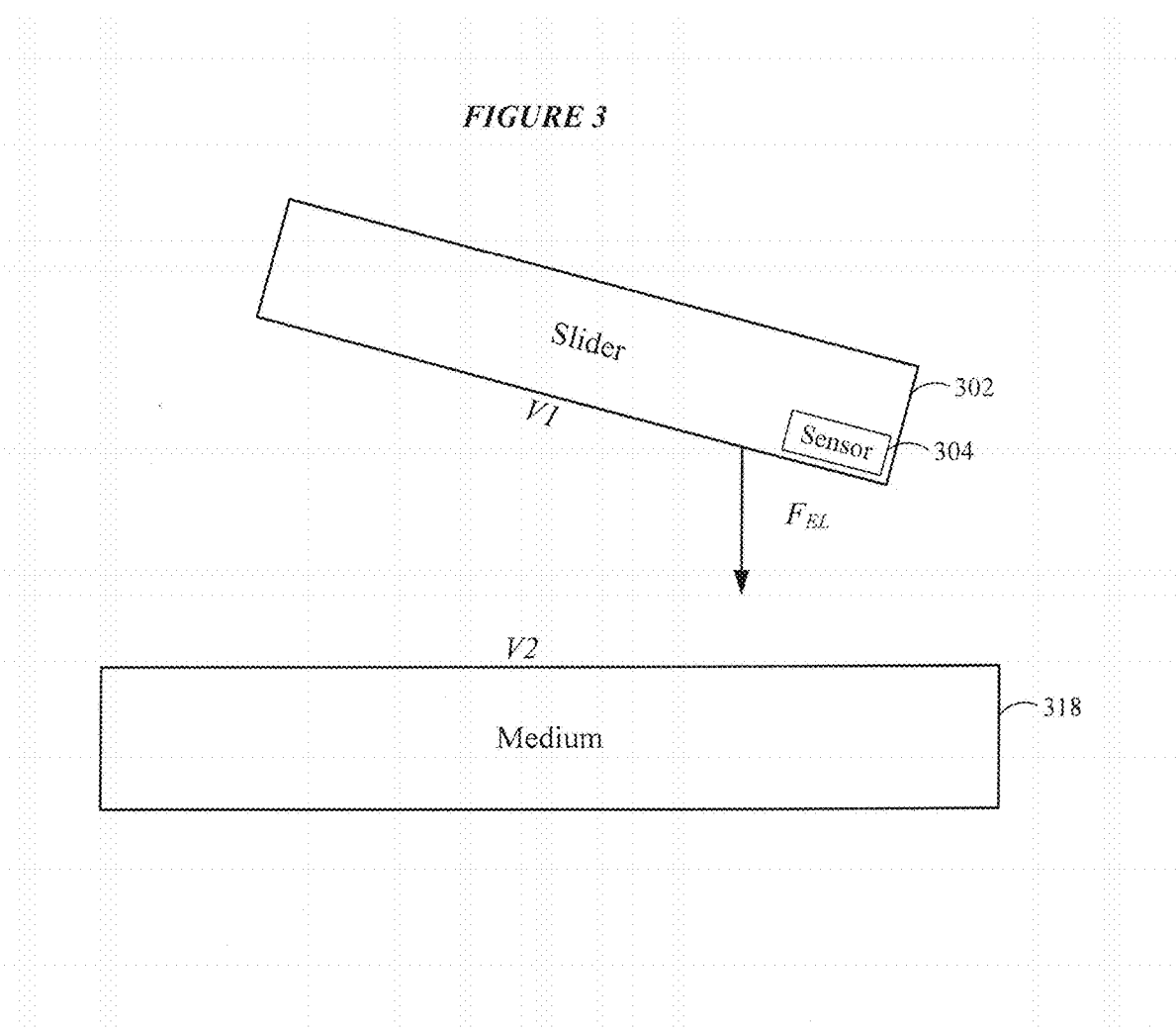

HEAD-MEDIUM CONTACT DETECTION USING A THERMAL SENSOR AND SURFACE CHARGE CONTROL OF A SLIDER

SUMMARY

Embodiments are directed to a method comprising applying an AC signal having a specified frequency and a DC offset voltage to one of a substrate of a slider and a magnetic recording medium. A low- or non-modulation interface is defined between the slider and the medium. The method comprises causing, in response to applying the AC signal, an oscillation in an electrostatic force between the slider and the medium at the specified frequency, and causing, by the oscillating electrostatic force, an oscillation in a signal produced by a thermal sensor at the slider. The thermal sensor signal oscillates at the specified frequency. The method also comprises adjusting a heater of the slider to decrease a spacing between the slider and the medium during oscillation of the electrostatic force. For each heater adjustment, a resistance of the thermal sensor is measured over a specified number of medium revolutions. The method further comprises detecting head-medium contact using one of an amplitude of a harmonic of the thermal sensor signal and a summation of amplitudes of all frequency components at the specified frequency.

Embodiments are directed to an apparatus comprising a slider configured to magnetically interact with a magnetic recording medium, and a low- or non-modulation interface defined between the slider and the medium. Circuitry is configured to apply an AC signal having a specified frequency to one of a substrate of the slider and the medium. The applied AC signal causes an oscillation in an electrostatic force and spacing between the slider and the medium at the specified frequency. An adjustable heater of the slider is configured to decrease a spacing between the slider and the medium during oscillation of the electrostatic force. A thermal sensor of the slider is configured to generate a sensor signal at the specified frequency in response to sensing changes in temperature resulting from the oscillating spacing. A detector is coupled to the circuitry and the thermal sensor. The detector is configured to measure a resistance of the thermal sensor over a specified number of medium revolutions for each heater adjustment, and detect head-medium contact using one of an amplitude of a harmonic of the thermal sensor signal and a summation of amplitudes of all frequency components at the specified frequency.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 1 shows a side view of a slider with which embodiments of the present disclosure can be implemented;

FIGS. 2 and 3 show side views of a slider with which embodiments of the present disclosure can be implemented;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 4:
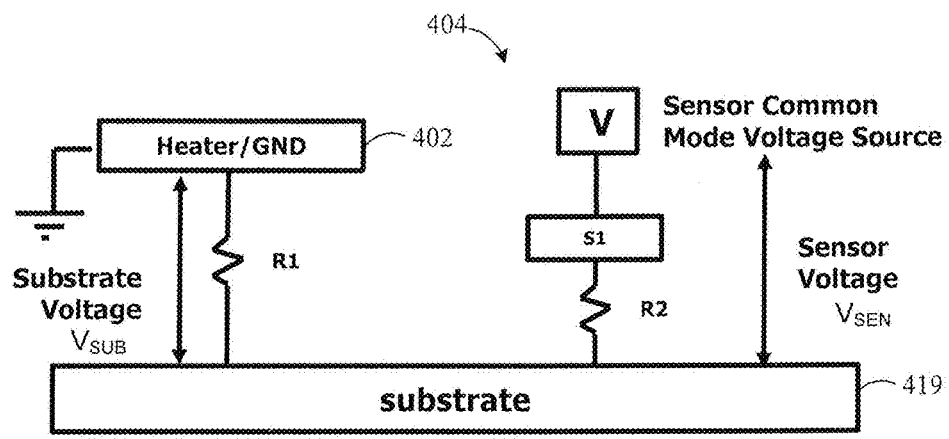
FIG. 4 is a diagram of an apparatus for generating an AC signal to facilitate surface charge control of a slider in accordance with various embodiments.

A transducer of a magnetic storage device includes components for recording information to and reading information from a magnetic recording medium. The transducer is usually housed within a small ceramic block called a slider. Sliders are aerodynamically designed to fly on a cushion of air that is generated due to rotating magnetic recording disks at high speeds. The slider has an air-bearing surface (ABS) that may include rails and a cavity or depression between the rails. The ABS is that surface of the slider nearest to the disk as the disk is rotating. Air is dragged between the rails and the disk surface causing an increase in pressure that tends to force the head away from the disk. Air is simultaneously rushing past the cavity or depression in the ABS which produces a lower than ambient pressure area at the cavity or depression. The low-pressure area near the cavity counteracts the higher pressure at the rails. These opposing forces equilibrate so the slider flies over the surface of the disk at a particular fly height. The fly height is the distance between the disk surface and the slider's ABS surface. During operation of a disk drive, the distance between the slider and the disk is very small, on the order of several nanometers. The constant demand for increasing hard drive recording density has resulted in a significant decrease in fly height over the years.

Good performance of the disk drive results when a slider is flown as closely to the surface of a disk as possible. An important function of a disk drive is to accurately set the clearance between the slider and the surface of the magnetic storage medium. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the medium during operation. Variation in slider fly height represents an increasingly complicated source of problems due to head/media intermittent contact. Intermittent contact induces vibrations that are detrimental to the reading/writing quality and may also eventually result in a recording head crash that causes the loss of data.

One source of variation in the fly height results from the differences in thermal expansion between the ceramic substrate and the transducer during operation of the disk drive. Due to intrinsic properties, the ceramic substrate and the transducer expand at different rates as the slider heats up. Other sources of variation in the fly height that can negatively affect the fly-height of the slider are lubricant-slider interaction, such as lube pickup, and electrostatic force. Triboelectric charging, for example, can result from the buildup of electrical potential between the disk and the slider caused by the rotating disk surface and/or from the buildup of electrical potential in motor bearings. The negative effects of these and other factors can be diminished and/or eliminated by controlling the voltage potential of the slider with respect to the potential of the disk, often referred to as surface charge control (SCC). Controlling the voltage of the slider can reduce slider wear and provide for lower recording head flying heights.

Although lower head/medium clearance provides for improved performance in a disk drive, the degree to which the slider can be lowered is limited due to the existence of a potential electric force between the slider and medium that is governed by Coulomb's law. If, however, the potential electric force at the medium can be measured, head/medium clearance can be lowered safely by adding an equivalent potential of opposite polarity to the slider, creating an attractive force therebetween. Using such an approach, both performance and reliability can be enhanced.

For an accurate write and read operations to occur, it is desirable to have a relatively small distance or spacing between a read/write head and its associated magnetic recording medium. This distance or spacing is known head-medium spacing, which is interchangeable with the term fly height. By reducing the fly height, a read/write head is typically better able to both write and read data to and from a medium. Reducing the fly height also allows for surveying of recording medium topography, such as for detecting asperities and other features of the recording medium surface. Head-medium contact detection and/or head-medium spacing sensing technologies contribute to the performance and reliability of magnetic storage systems. Higher contact detection repeatability enables lower active clearance, and thus higher recording density. Higher contact detection sensitivity reduces wear and improves reliability.

Contact detection may be performed before the slider-medium system begins any type of recording. Contact detection may be performed on a head-by-head basis and can require significant interaction time between head and disk. Today, many systems implement a contact detection scheme which involves determining the heater power necessary to cause thermal expansion of the slider (head) from a passive fly condition to intermittent slider-medium contact. This intermittent contact may cause significant modulation of the slider fly height. The modulation of slider fly height then results in modulation of heat transfer between the head and disk. A thermal proximity sensor, for example a dual ended temperature coefficient of resistance (DETCR) sensor, can easily pick up these relatively large fluctuations in slider-medium heat transfer. The readings from the thermal proximity sensor in combination with the heater power can be used to establish contact detection.

However, newly developed low clearance technology (LCT) head-medium systems have reduced or eliminated fly height modulation due to intermittent slider-medium contact. The reduction/elimination of fly height modulation has beneficially resulted in the reduced wear of the head during contact detect and unintended slider-medium interaction. However, it has also resulted in the reduction of contact detection strength by the sensors, and/or techniques, that rely on the fly height modulation. As such, in response to the contact detect challenges presented by LCT slider-medium systems, a low-frequency AC heater (LFACH) contact detect scheme has been developed. In LFACH, the amplitude of the heater voltage/power follows an oscillation that causes the fly height to follow the same oscillation. A thermal proximity sensor (e.g., DETCR) in the head detects the oscillation and produces an oscillating sensor signal, which when combined with the heater power can be used to determine the contact detect.

LFACH can have its own limitations in that it may be limited to low heater frequencies, such as those under 1 kHz. At higher frequencies, the fly height does not respond to fluctuations in the power dissipated at the heater. One limitation to heater-induced fly modulation is the thermal time constant for heating the portion of the slider that forms a thermal protrusion. This involves the slider reaching a steady "hot" temperature, with a protrusion and reduced clearance, then cooling to a steady state "cold" temperature with reduced protrusion and increased clearance. If the heater voltage is oscillated too quickly, the slider temperature, as well as the resultant protrusion and clearance, do not have time to respond to the oscillating heater signal and contact detection by LFACH is ineffectual. It is noted that thermal time constraints for heater-induced expansion/retraction may be ~400-500 μs, in which case heater induced fly modulation can be limited to under about 1 kHz.

The limited LFACH frequency range (<1 kHz) has been found to be problematic because it supports a relatively slow contact detection capability. In contrast, embodiments of the disclosure provide a contact detection capability that is much faster than an LFACH approach. Contact detection according to various embodiments provides faster contact detection requiring a shorter time in which the head is in contact with the disk. This results in reduced wear.

Embodiments of the disclosure are directed to detecting contact between a read/write head (e.g., a slider) and a magnetic recording medium for low- or non-modulation slider-medium-interfaces defined between the head and the medium (e.g., as in LCT slider-medium systems). As was discussed previously, in a low- or non-modulation HDI, the air bearing is relatively stiff. Because the HDI is a low- or non-modulation interface, a temperature signal produced by a thermal contact sensor, for example, is substantially devoid of a varying signal component during head-medium contact. More particularly, the temperature signal is substantially devoid of an AC component during head-medium contact. Although there may be a small RMS component of the temperature signal, any such RMS component is not usable in the context of conventional contact detection schemes that rely on slider-medium modulation. Hence, the relatively stiff air bearing of a low- or non-modulation HDI makes it challenging to detect head-medium contact events and to accurately set clearance using conventional techniques.

Detecting head-medium contact and accurately setting clearance at middle diameter (MD) locations of a magnetic recording medium is particularly challenging using conventional techniques in a low- or non-modulation HDI system. For example, it has been found that techniques that use modulation in a position error signal (PES) to detect head-medium contact are unreliable and cannot be used to declare head-medium contact events at the middle diameter (MD) location due to the small skew angle between the head and spinning recording medium. Embodiments of the disclosure are directed to apparatuses and methods that provide for reliable detection of head-medium contact events for low- or non-modulation HDIs and for contact events occurring at middle diameter locations of a medium in a low- or non-modulation HDI system.

FIG. 1 shows a side view of a slider 102 with which embodiments of the present disclosure can be implemented. The slider 102 includes a slider body 104 and a transducer portion 106 provided within an overcoat region 108 at the trailing edge of the slider 102. The slider 102 is attached via an adhesive 110 to a trace-gimbal assembly (TGA) 112. An air-bearing surface 114 of the slider 102 is shown proximate the surface 116 of a magnetic recording medium 118 (e.g., a disk). The fly height 120 is also indicated. With reference also to FIG. 2, during operation, relative movement between the slider 102 and the medium 118 creates a triboelectric charge (shown as charge q1) on the slider 102 relative to the medium 118 (shown as charge q2). Both contact and near-contact operations accumulate a triboelectric charge on the slider 102 during normal operation and also during take-off and landing.

The slider 102 is subject to a Surface Potential Difference (SPD), also known as Contact Potential Difference and Volta Potential Difference, which is an electrostatic potential difference between two surfaces in close proximity. This occurs for two conductors in electrical contact due to differences in the work function of the material at the surface. Embodiments of the disclosure involve controlling the SPD at a slider-medium interface (HDI), such as that shown in FIGS. 1 and 2. Embodiments of the disclosure involve controllably oscillating the SPD for purposes of detecting changes in slider-medium spacing and slider-medium contact.

FIG. 3 shows a slider 302 in proximity to the surface of a magnetic recording medium 318. According to various embodiments, a low-modulation (or non-modulation) head-disk interface is defined between the slider 302 and the medium 318. Circuitry can be implemented to apply a non-zero voltage potential to the slider 302 with respect to the potential (e.g., ground or other fixed voltage) of the medium 318. In some embodiments, circuitry can be implemented to apply a non-zero voltage potential to the medium 318 with respect to the potential (e.g., ground or other fixed voltage) of the slider 302. In the embodiment shown in FIG. 3, an AC signal with a DC offset voltage, V1, is applied to the slider 302, where V1 can be represented as a voltage defined by $V_{DC}+V_{AC}\sin(\omega t)$, where $V_{DC}$ is the DC bias voltage component of V1 and $V_{AC}\sin(\omega t)$ is the AC voltage component of V1. A voltage, V2, is applied to the medium 318, where V to can be represented as a fixed voltage, which may be ground.

In this illustrative embodiment, the AC signal, V1, represents an SCC signal that applies a bias voltage to the slider 302, effectively changing the electrostatic potential difference between the slider 302 and the medium 318. The square of the potential difference is proportional to the electrostatic force between the slider 302 and the medium 318. The electrostatic force between the slider 302 and the medium 318 contributes to the equilibrium flying height of the slider 302. Thus, as the SCC signal (V1) is changed, the fly height of the slider 302 is also changed. The fly height change of the slider 302 is large enough that a thermal signal is detectable by a sensor 304 situated on the slider 302.

Consider the scenario where the SCC signal (V1) is applied to the slider 302 and a signal is measured that depends on the electrostatic force between the slider 302 and the medium 318. This electrostatic force, $F_{EL}$, can be represented by the following expression:

$$F_{EL} = -\frac{1}{2}\left(\frac{dC}{dz}\right)V^2$$

where C is the capacitance between the head and medium, z is the head medium spacing, and V is the voltage difference between head and medium. This electrostatic force, $F_{EL}$, has components at first and second harmonics of the SCC signal frequency. The force component, Fω, associated with the first harmonic of the SCC signal frequency can be represented by the following expression:

$$F_\omega = -\left(\frac{dC}{dz}\right)(\phi - V_{DC})V_{AC}\sin(\omega t)$$

where $\phi$ is the SPD at the slider-medium interface, $V_{DC}$ is the DC bias voltage component of V1, $V_{AC}$ is the AC voltage component of V1, and $\omega$ is the frequency of the SCC signal. The force component, $F_{2\omega}$, associated with the second harmonic of the SCC signal frequency can be represented by the following expression:

$$F_{2\omega} = \frac{1}{4}\left(\frac{dC}{dz}\right)V_{AC}^2\cos(2\omega t)$$

According to various embodiments, the response of the thermal sensor signal at the first harmonic or the second harmonic of the SCC driving frequency can be calculated by a software lock-in algorithm implemented by a processor of the drive electronics (e.g., a detector).

The AC SCC contact detection method disclosed herein is similar in some respects to the aforementioned contact detection method known as Low Frequency AC Heater. As was discussed previously, LFACH modulates fly height by adjusting heater power at a specified frequency. LFACH has two important disadvantages; the contact detection response time, and the second concerns thermal noise. First, fly height modulation by heater power is limited by the response time of head thermal expansion. Typically, the maximum LFACH rate is 1 kHz. Fly height modulation by AC SCC is known to be much faster. For example, the fly height response using an AC SCC approach can be above 100 kHz, for example. Second, the thermal sensor resistance measurement is sensitive to head thermal fluctuations from both spacing and heater power. During LFACH, the modulating heater power changes the steady-state head temperature independently of any thermal expansion based fly height change. This acts a noise source, polluting the thermal fluctuations due to head disk spacing. An AC SCC contact detection approach is advantageous because it allows for fly height modulation without changing the heater power.

FIG. 4 is a diagram of an apparatus that facilitates surface charge control of a slider in accordance with various embodiments. The apparatus shown in FIG. 4 includes a substrate 419 of a slider to which two circuits are coupled. One of the circuits includes a heater 402 or ground, depending on the particular implementation, coupled to the substrate 419 through a resistance R1 (e.g., 40 KΩ). The voltage potential $V_{SUB}$ across the resistance R1 can be adjusted to control the surface potential of the slider. The other circuit includes a thermal sensor 404 (S1) coupled to the substrate 419 through a resistance R2 (e.g., 10 KΩ) and to a voltage source V, which is configured to generate an AC SCC signal. For example, a common mode voltage of a preamp circuit for the thermal sensor S1 can be used for the voltage source V. The potential between the voltage source V and the substrate 419 corresponds to the sensor voltage, $V_{SEN}$. The potential of the substrate 419 in this representative example is given by $V_{SEN}$*40 KΩ/(40 KΩ+10 KΩ).

Figure 5:
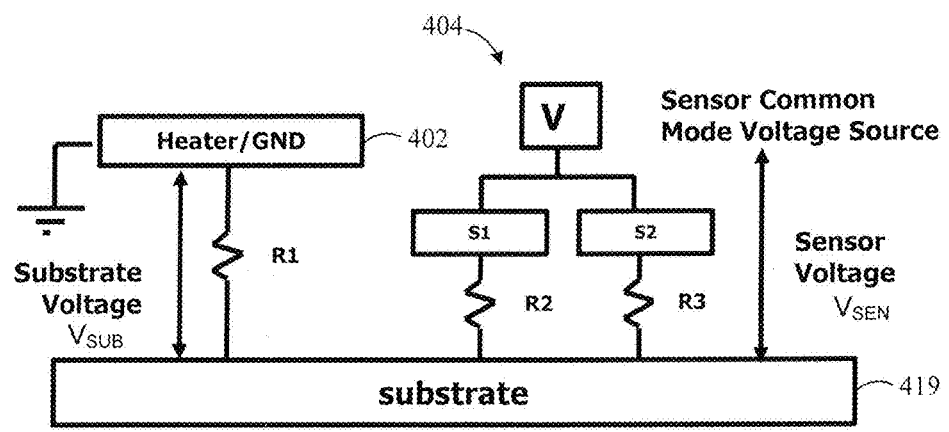
FIG. 5 is a diagram of an apparatus for generating an AC signal to facilitate surface charge control of a slider in accordance with various embodiments.

FIG. 5 is a diagram of an apparatus that facilitates surface charge control of a slider in accordance with other embodiments. The apparatus shown in FIG. 5 is similar to that illustrated in FIG. 4, except that the sensor 404 includes two thermal sensors S1 and S2 (e.g., one at the writer close point and the other at the reader close point). In one implementation, the value of R1 is 40 KΩ, and R2 and R3 are 10 KΩ. Accordingly, the potential of the substrate 119 in this representative example is given by $V_{SEN}$*40 KΩ/(40 KΩ+5 KΩ).

According to the embodiments shown in FIGS. 4 and 5, the heater circuitry 402 is configured to set the voltage potential of the substrate 419 (e.g., AlTiC) and the thermal sensor circuitry 404 is configured to cause an oscillation of the surface potential of the substrate 419, in addition to detecting one or both of head-medium spacing changes and head-medium contact. In this regard, the thermal sensor circuitry 404 is configured to operate in multiple modes; a contact detection mode (which includes fly height detection) and an SCC mode. In the contact detection mode, the thermal sensor circuitry 404 is configured to sense signals indicative of temperature and temperature changes across the sensor S1 (or S1 and/or S2). In the SCC mode, the thermal sensor circuitry 404 is configured to drive an AC signal into the substrate 419 for purposes of oscillating the surface potential of the slider. According to various embodiments, a low-modulation (or non-modulation) head-disk interface is defined between the slider and the adjacent magnetic recording medium.

Figure 6:
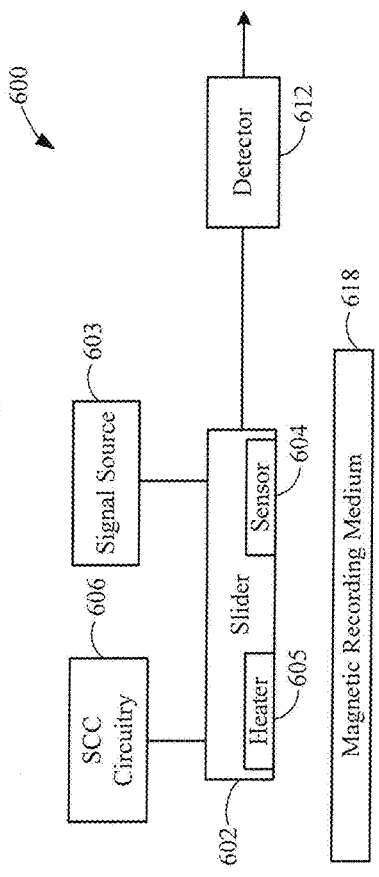
FIG. 6 is a block diagram of an apparatus for generating an AC signal to facilitate surface charge control of a slider and detecting head-medium contact in accordance with various embodiments.

FIG. 6 is a block diagram of an apparatus configured to facilitate surface charge control of a slider and to detect head-medium contact during a procedure to set slider clearance in accordance with various embodiments. The system 600 shown in FIG. 6 includes a slider 602 on which a thermal sensor 604 is provided. Although the sensor 604 can be of varying type, the sensor 604 may be a resistance temperature sensor composed of materials having a temperature coefficient of resistance (TCR) according to various embodiments. Other types of thermal sensors can be employed, such as a varistor or a thermocouple, for example. One example of a TCR sensor is a dual-ended temperature coefficient of resistance sensor (DETCR), in which each end is coupled to a bias source (e.g., bond pad of the transducer). Another example of a TCR sensor is a ground-split (GS) temperature coefficient of resistance sensor, in which one end of the GSTCR is coupled to ground and the other is coupled to a bias source. A TCR sensor measures temperature change by measuring the change in resistance, or rate of change in resistance, across the sensor. The thermal sensor 604 can be situated near or at the ABS of the slider at a close point (e.g., a close point at the writer), and configured to measure the temperature change at the ABS induced by all thermal condition changes from air pressure, clearance, head operation, and contact, among other changes.

As is further shown in FIG. 6, SCC circuitry 606 is coupled to the slider 602 and configured to apply an SCC signal (e.g., a DC SCC signal) to the slider 602 to control the voltage potential of the slider 602 with respect to the potential of a magnetic recording medium 618. A signal source 603 is coupled to the slider 602, such as via the sensor 604, and configured to generate an AC electrical signal having a DC offset voltage. The AC signal applied to the slider 602 in this embodiment causes an oscillation in an electrostatic force between the slider 602 and the medium 618 at a specified frequency of the AC signal. The sensor 604, in response to the electrostatic force oscillation, produces a sensor signal that oscillates at the specified frequency of the AC signal. The sensor 604 is coupled to a detector 612 which is configured to receive a signal from the sensor 604 and measure resistance for each adjustment made to a heater 605 of the slider 602. Adjustments of the heater 605 cause changes in fly height of the slider 602. For example, the heater 605 can be adjusted incrementally (e.g., incrementally increasing heater power) to decrease the spacing between the slider 602 and the medium 618 during oscillation of the electrostatic force as part of a procedure to set clearance. The detector 612 is configured to detect head-medium contact using an amplitude of a harmonic (e.g., first or second) of the thermal sensor signal or a summation of amplitudes of all frequency components at the specified frequency.

Figure 7:
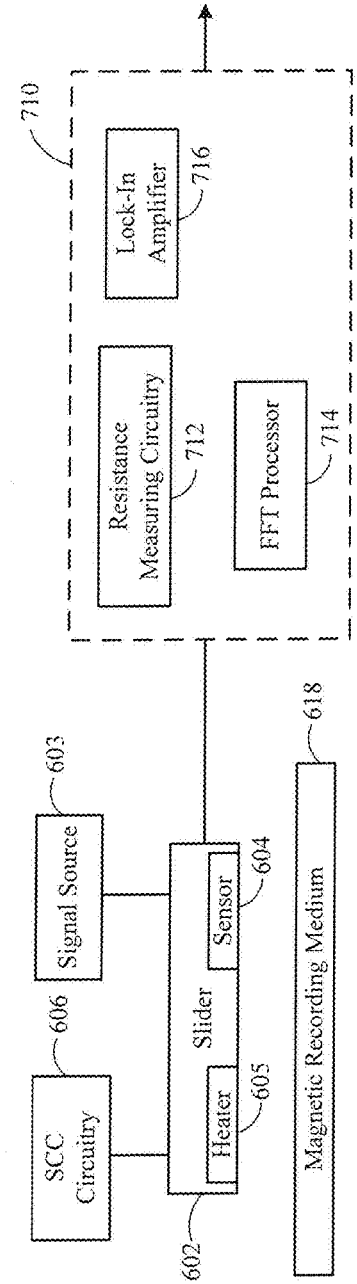
FIG. 7 is a block diagram of an apparatus for generating an AC signal to facilitate surface charge control of a slider and detecting head-medium contact in accordance with various embodiments.

FIG. 7 is a block diagram of an apparatus configured to facilitate surface charge control of a slider and detect head-medium contact during a procedure to set clearance in accordance with various embodiments. The system 700 shown in FIG. 7 includes many of the components of the embodiment shown in FIG. 6, but includes a detector 710 implemented in accordance with one embodiment of the disclosure. In the embodiment shown in FIG. 7, the sensor 604 is implemented as a resistance temperature sensor (e.g., a DETCR or a GSTCR). The detector 710 includes resistance measuring circuitry 712 configured to measure a resistance of the sensor 604 in response to changes in slider fly height resulting from adjustments made to the heater 605 during a procedure to set clearance. The detector 710 also includes a processor 714 configured to perform an FFT of resistance temperature sensor data for each adjustment made to the heater 605. The detector 712 further includes a frequency lock-in amplifier 716 configured to determine an amplitude from the FFT data at the specified frequency of the AC electrical signal for each of the heater adjustments. It is noted that slider fly height and the frequency lock-in amplitude will be a linear function of the DC offset voltage of the ACC SCC signal applied to the substrate of the slider or the recording medium. The detector 710 is configured to detect an excursion in the trajectory of the FFT data amplitudes indicative of contact between the slider 602 and the medium 618. This excursion may be detected as a change in FFT data amplitude that exceeds a percentage change threshold, a predetermined change in the standard deviation, some other fixed or variable predetermined threshold, or an abrupt change in slope of an FFT amplitude curve (see, e.g., FIG. 13).

The AC electrical signal with DC offset voltage can be generated in situ a disk drive in several ways. One approach involves the use of a preamplifier that is coupled to the sensor 604. An AC signal can be generated by the preamplifier or circuitry coupled to the preamplifier, and communicated to the slider 602 via the sensor 604. Another approach involves use of disk rotation to facilitate generation of the AC SCC signal or use of voltage injected through the spindle motor hub. For example, one technique involves deriving the frequency of the AC SCC signal based on disk RPM. Another approach involves use of the servo automatic gain control (AGC), by which the frequency of the AC SCC signal is generated based on the number of servo wedges and the servo sampling frequency. For example, one approach involves 384 servo wedges with the disk spinning at 5400 RPM to generate an AC signal having a frequency of 34 KHz/4 in order to create a suitable sine wave.

Figure 8:
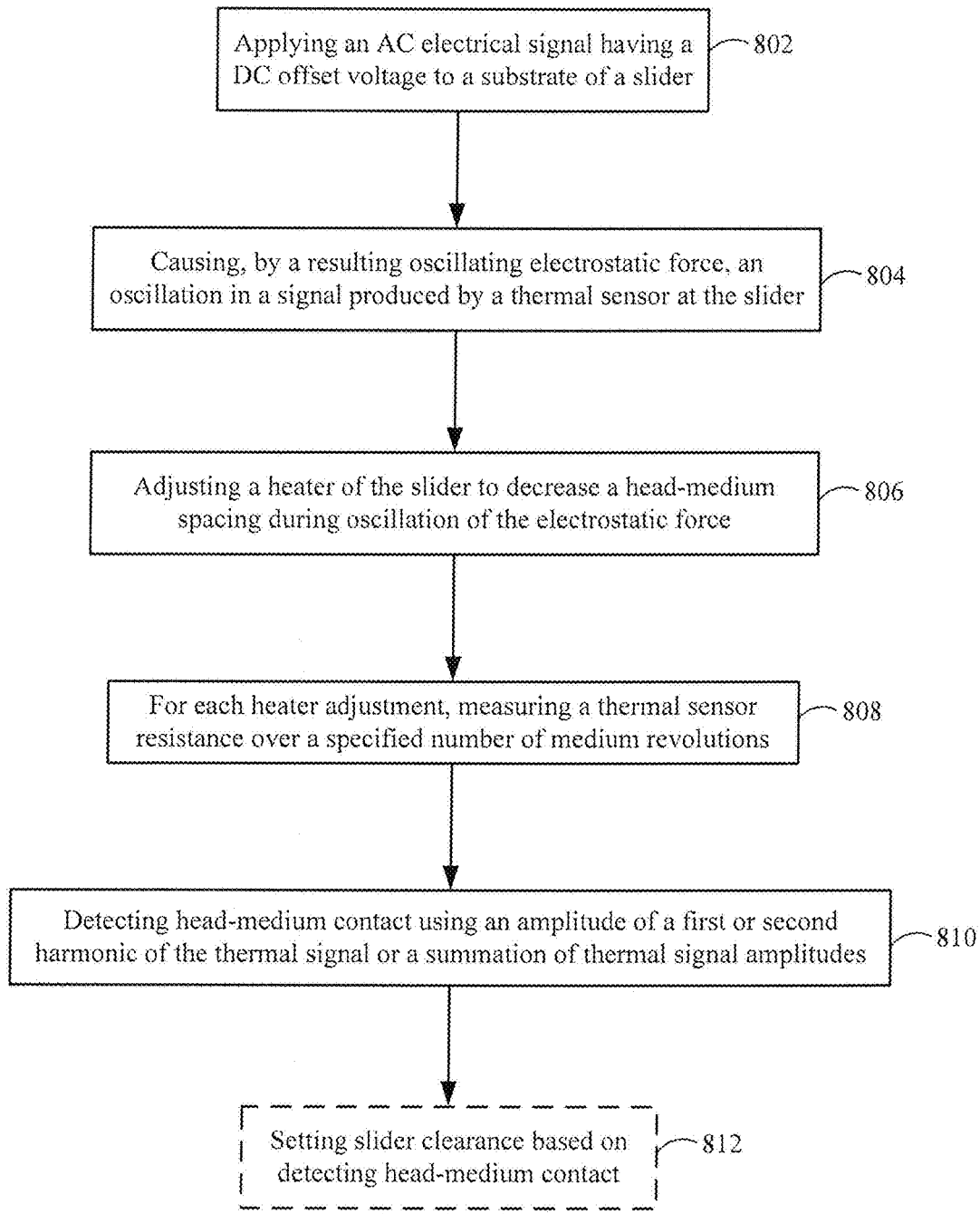
FIG. 8 is a flow diagram illustrating a method of controlling surface charge of a slider and detecting head-medium contact in accordance with various embodiments.

FIG. 8 is a flow chart showing various processes of a method of facilitating surface charge control of a slider and detecting head-medium contact in accordance with various embodiments. The method shown in FIG. 8 involves applying 802 an AC electrical signal having a DC offset voltage to a substrate of a slider. The method also involves causing 804, by a resulting oscillating electrostatic force, an oscillation in a signal produced by a thermal sensor at the slider. The method further involves adjusting 806 a heater of the slider (e.g., by incrementally increasing heater power) to decrease a head-medium spacing during oscillation of the electrostatic force. The method also involves measuring 808 a thermal sensor resistance over a specified number of medium revolutions for each heater adjustments. The method further involves detecting 810 head-medium contact using an amplitude of a first or second harmonic of the thermal signal or a summation of thermal signal amplitudes. The method can optionally involve setting 812 slider clearance based on detecting head-medium contact.

Figure 9:
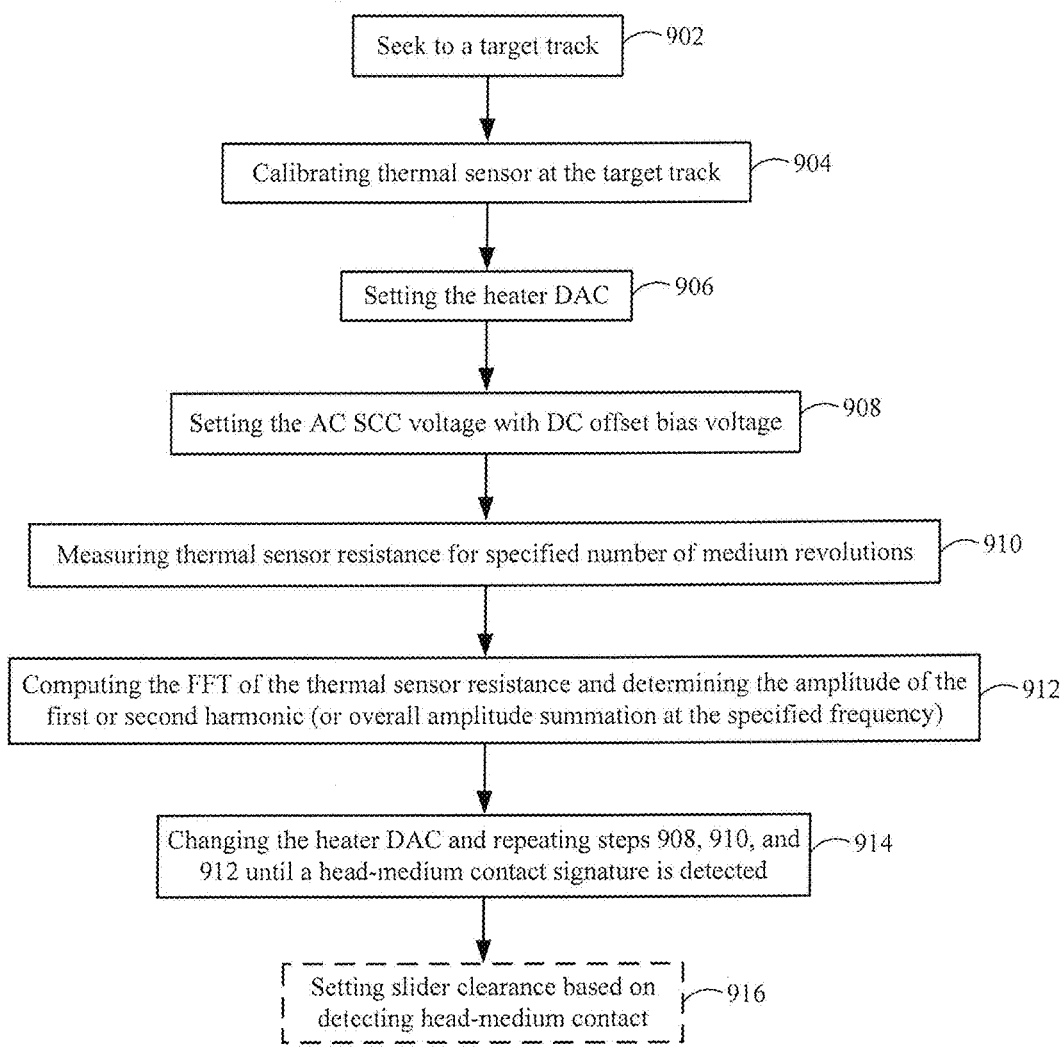
FIG. 9 is a flow diagram illustrating a method of controlling surface charge of a slider and detecting head-medium contact in accordance with various embodiments.
Figures 10A, 10B:
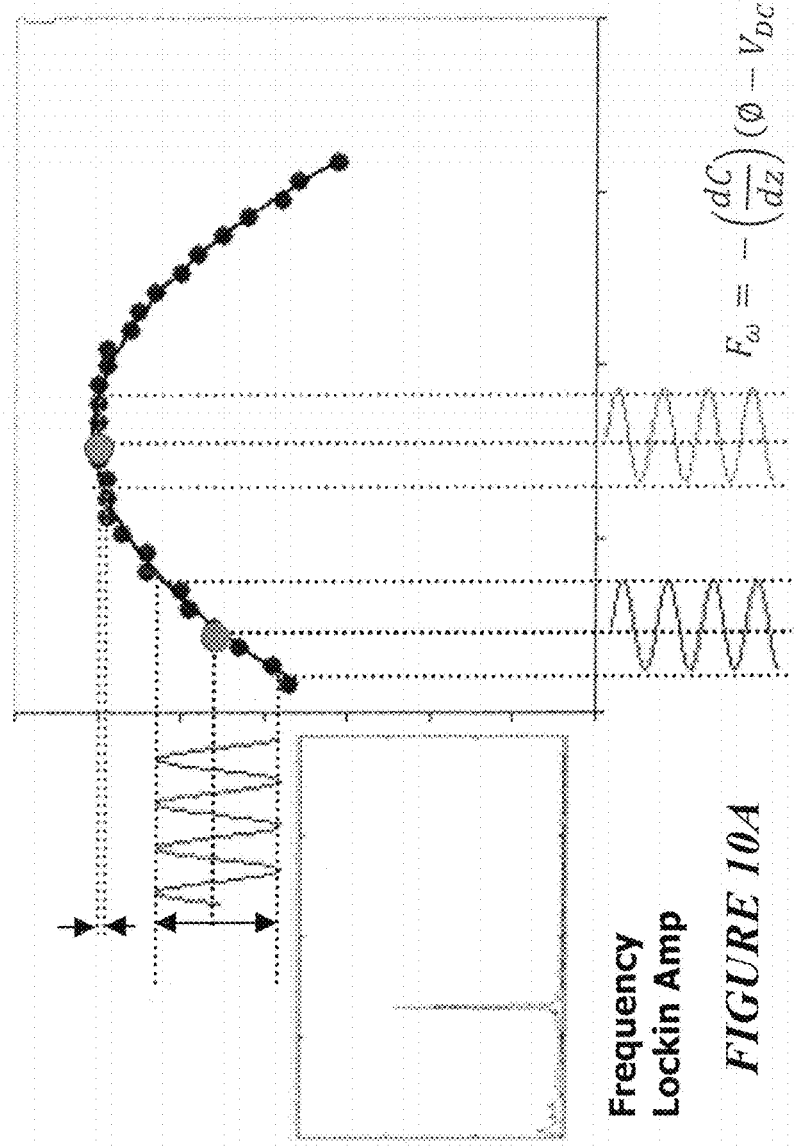
FIGS. 10A-10B are graphs associated with different processes of the methodology shown in FIG. 9.

FIG. 9 is a flow chart showing various processes of a method of facilitating surface charge control of a slider and detecting head-medium contact in accordance with other embodiments. The method shown in FIG. 9 involves performing 902 a seek to arrive at a target track, and calibrating 904 a thermal sensor of the slider at the target track. More particularly, a DC calibration for conducting thermal sensor resistance measurements at the target track is performed. The method also involves setting 906 a heater of the slider to a specified power level, such as by setting the heater DAC (digital-to-analog-converter) to a specified value. It is understood that adjusting the heater DAC results in a corresponding adjustment in fly height of the slider. The method further involves setting 908 the AC SCC voltage with DC offset bias voltage, which is injected into the substrate of the slider. The method involves measuring 910 thermal sensor resistance for a specified number of medium revolutions, such as 10 revolutions. The method also involves computing 912 the FFT of the thermal sensor resistance and determining the amplitude of the first or second harmonic or, in some embodiments, the overall amplitude summation at the specified (e.g., lock-in) frequency of the AC SCC voltage signal, as is illustrated in FIGS. 10A and 10B. The method further involves changing 914 the heater DAC, such as by increasing the heater power level, and repeating steps 908, 910, and 912 until a head-medium contact signature is detected. The method can optionally involve setting 916 slider clearance based on detecting head-medium contact.

Figures 11A, 11B:
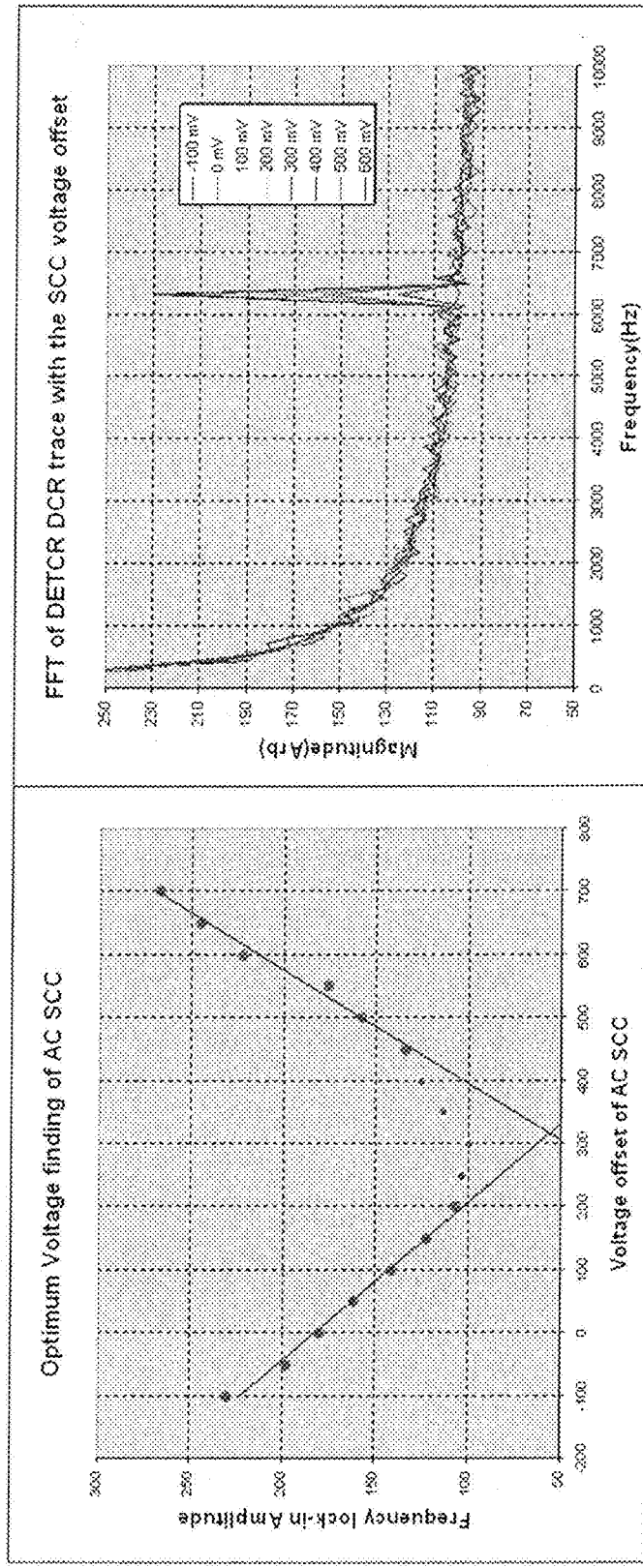
FIGS. 11A and 11B are graphs associated with different processes of the methodology shown in FIG. 9.

FIG. 11A is a graph that illustrates finding of a working (e.g., minimum) DC offset voltage of an AC electrical signal that can be generated as part of a surface charge control methodology for a slider in accordance with various embodiments. FIG. 11A is a plot of DC voltage offset of an AC electrical signal versus frequency lock-in amplifier amplitude. It can be seen in FIG. 11A that the plot has an asymmetric shape, and defines the SCC DC offset voltage range provided by the preamp that generates the AC electrical signal. FIG. 11B is a graph showing the FFT of the resistance sensor traces resulting from application of an AC signal having different DC offset voltages to a slider. In this illustrative example, the AC signal had a frequency of 6400 Hz. The peak amplitudes of the AC signals with differing DC offset voltage are shown centered around 6400 Hz, which corresponds to the lock-in frequency of the lock-in amplifier. The representative example shown in FIGS. 11A and 11B demonstrates that the AC SCC methodology found a working (e.g., minimum) DC offset voltage of 300 mV$_{PP}$. It is noted that the minimum DC offset voltage shown in FIG. 11A represents a neutralizing voltage that is equal in magnitude to the electrostatic potential difference between the slider and the disk.

Figures 12A, 12B:
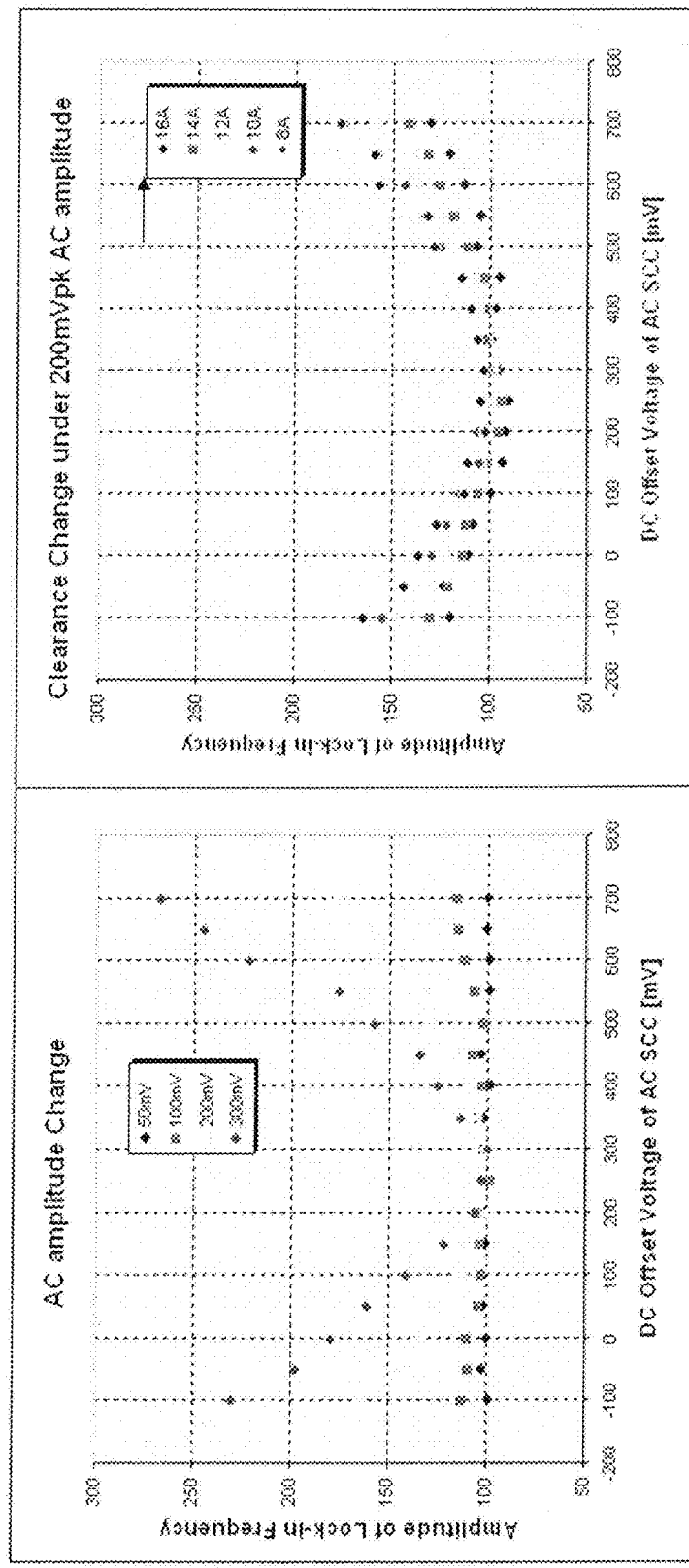
FIGS. 12A and 12B are graphs associated with different processes of the methodology shown in FIG. 9.

FIG. 12A is a graph showing the effects of AC amplitude change on the resistance sensor response. FIG. 12A is a plot of DC offset voltage of an AC SCC signal versus lock-in amplifier amplitude at the lock-in frequency. The plot of FIG. 12A demonstrates that higher AC signal amplitudes (higher oscillation amplitudes) results in higher fly height changes and higher DC resistance sensor oscillation. It can be seen from FIG. 12A that higher amplitude AC SCC signals have steeper slopes which can facilitate efficient searching for a working DC offset voltage (e.g., a minimum DC offset voltage). FIG. 12B is a graph showing slider clearance change in response to an AC SCC signal having an amplitude of 200 mV$_{PP}$ applied to the slider. FIG. 12B is a plot of DC offset voltage of the AC SCC signal versus lock-in amplifier amplitude at the lock-in frequency. FIG. 12B demonstrates that slider clearance does not have an effect on the AC SCC measurement.

Figures 13, 14:
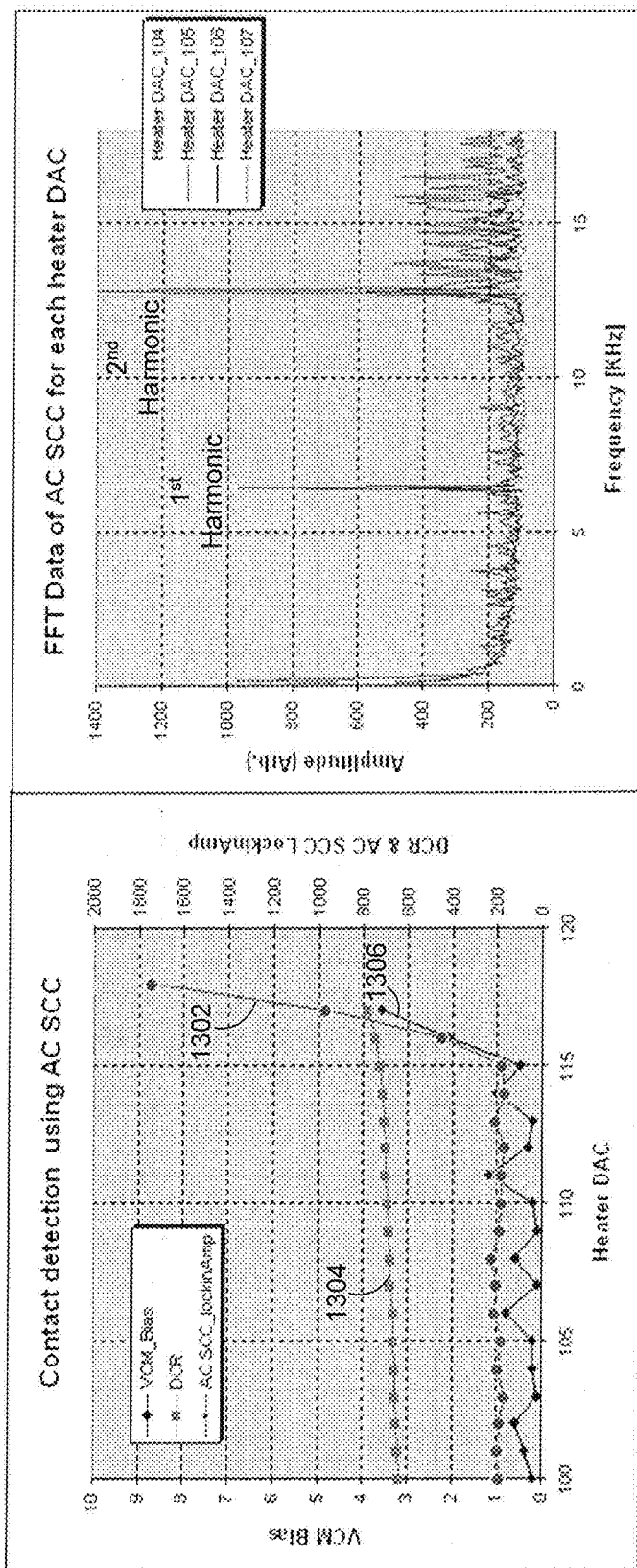
FIG. 13 is graph showing contact detection using an AC SCC signal having a DC offset in accordance with various embodiments.
FIG. 14 is a graph showing FFT amplitude data of thermal sensor resistance traces as a function of frequency for four different heater DAC values in accordance with various embodiments.

FIG. 13 is graph showing contact detection using an AC SCC signal having a DC offset in accordance with various embodiments. In the case of FIG. 13, the AC SCC signal was a 300 mV AC signal with a frequency of 6400 Hz and a 100 mV DC offset. The graph of FIG. 13 show three plots 1302, 1304, and 1306 each corresponding to a different technique for detecting head-medium contact. Plots 1304 and 1306 were developed to corroborate the detection of head-medium contact indicated in plot 1302. Plot 1302 shows thermal sensor amplitude data output from a lock-in amplifier as discussed hereinabove. Plot 1304 shows DCR data. DCR refers to the DC resistance of the resistance temperature sensor, which is sensitive to head-medium spacing changes. DCR is acquired during servo tracing at every servo wedge, much like the PES. Plot 1306 shows VCM (voice coil motor) bias data, which corresponds to VCM bias needed to compensate for servo tracking disturbances, including head-medium contact events. It can be seen in FIG. 13 that the VCM bias data of plot 1306 corroborates the thermal sensor amplitude data of plot 1302, but the DCR data of plot 1304 does not.

The magnitude of the AC SCC lock-in amplitude data of plot 1302, the DCR data of plot 1304, and the VCM bias data of plot 1306 is plotted as a function of incrementally increasing heater DAC values (from 100 to about 118). It can be seen in FIG. 13 that plots 1302, 1304, and 1306 are relatively unchanged or consistent for heater DAC values between 100 and 115. This indicates that the slider is flying above the medium with no head-medium contact. However, for heater DAC values between 115 and 118, the thermal sensor amplitude data of plot 1302 increase dramatically, which is a clear contact detection signature indicating that head-medium contact has occurred. The VCM bias data of plot 1306 corroborates the contact detection signature of plot 1302.

FIG. 14 is a graph showing FFT amplitude data of the thermal sensor resistance traces as a function of frequency for four different heater DAC values. FIG. 14 demonstrates that FFT amplitude data is highly pronounced at the first harmonic (e.g., 6.4 KHz) and the second harmonic (e.g., 12.8 KHz) of the AC SCC signal having a DC offset. It can be seen in FIG. 14 that using an AC SCC signal having a DC offset for contact detection effectively boosts the fly height oscillation signature of the slider, thereby enhancing head-medium contact detection. Using an AC SCC signal having a DC offset for contact detection also eliminates temperature variations due to heater oscillation associated with an LFACH technique, and also provides a significantly faster response time as compared to an LFACH technique.

It has been determined that use of an AC SCC signal with DC offset voltage is preferred over a DC SCC signal approach for detecting head-medium contact for several reasons. One reason is that the fly height of the slider or frequency lock-in amplitude is a linear function of DC offset voltage of the AC SCC signal, while a DC SCC signal has a second order polynomial response of fly height as function of DC SCC voltage. Also, the amplitude of the AC SCC signal can be adjusted (e.g., increased) to achieve a desired slope steepness to facilitate detection and identification of the measured sensor resistances indicative of head-medium contact.

Figure 15:
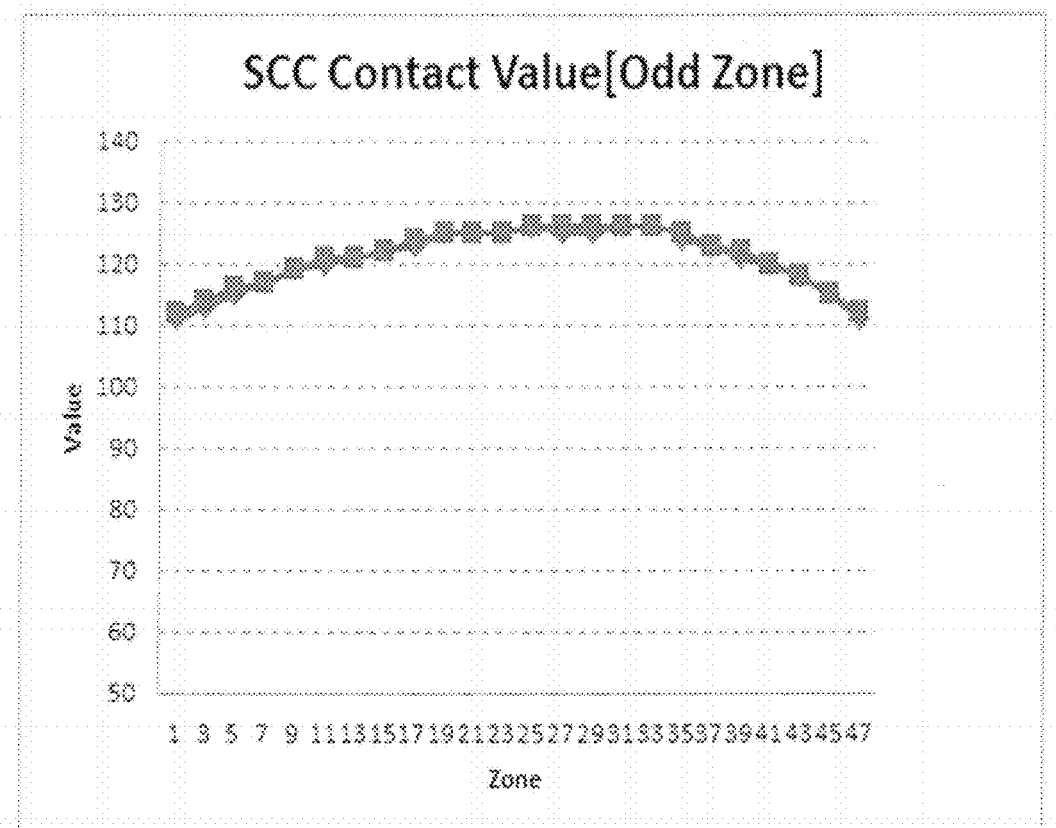
FIG. 15 is a graph showing AC SCC contact values for odd zones across the diameter of a magnetic recording medium under test in accordance with various embodiments.

FIG. 15 is a graph showing AC SCC contact values for odd-numbered zones across the diameter of a magnetic recording medium under test. The contact data shown in FIG. 15 demonstrates that head-medium contact can be detected at any zone of the medium, including inner diameter (ID) zones, outer diameter (OD) zones, and middle diameter (MD) zones. It is noted that the DC offset of the AC SCC signal can be adjusted (e.g., optimized) to facilitate head-medium contact detection across all zones of the medium.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A method, comprising:
applying an AC signal having a specified frequency and a DC offset voltage to one of a substrate of a slider and a magnetic recording medium, a low- or non-modulation interface defined between the slider and the medium;
causing, in response to applying the AC signal, an oscillation in an electrostatic force between the slider and the medium at the specified frequency;
causing, by the oscillating electrostatic force, an oscillation in a signal produced by a thermal sensor at the slider, the thermal sensor signal oscillating at the specified frequency;
adjusting a heater of the slider to decrease a spacing between the slider and the medium during oscillation of the electrostatic force;
for each heater adjustment, measuring a resistance of the thermal sensor over a specified number of medium revolutions; and
detecting head-medium contact using one of an amplitude of a harmonic of the thermal sensor signal and a summation of amplitudes of all frequency components at the specified frequency.

2. The method of claim 1, wherein the harmonic is a first harmonic.

3. The method of claim 1, wherein the harmonic is a second harmonic.

4. The method of claim 1, wherein detecting comprises detecting head-medium contact using the summation of amplitudes of all frequency components at the specified frequency.

5. The method of claim 1, wherein applying the AC signal comprises applying the AC signal to the slider substrate via the thermal sensor.

6. The method of claim 1, wherein:
applying comprises applying the AC signal using a circuit that includes the thermal sensor; and
detecting comprises detecting head-medium contact using the circuit.

7. The method of claim 1, wherein applying the AC signal comprises injecting the AC signal through a hub of a spindle motor configured to rotate the medium.

8. The method of claim 1, wherein the frequency of the AC signal is defined in relation to a servo sampling rate.

9. The method of claim 1, wherein:
measuring the thermal sensor resistance comprises performing a Fast Fourier Transform (FFT) of the thermal sensor resistance measurements; and
detecting head-medium contact comprises determining the amplitude or summation of amplitudes from the FFT data at the specified frequency.

10. The method of claim 1, wherein detecting head-medium contact is performed across a plurality of zones of the medium including inner diameter (ID) zones, outer diameter (OD) zones, and middle diameter (MD) zones.

11. An apparatus, comprising:
a slider configured to magnetically interact with a magnetic recording medium;
a low- or non-modulation interface defined between the slider and the medium;
circuitry configured to apply an AC signal having a specified frequency to one of a substrate of the slider and the medium, the applied AC signal causing an oscillation in an electrostatic force and spacing between the slider and the medium at the specified frequency;
an adjustable heater of the slider configured to decrease a spacing between the slider and the medium during oscillation of the electrostatic force;
a thermal sensor of the slider configured to generate a sensor signal at the specified frequency in response to sensing changes in temperature resulting from the oscillating spacing; and
a detector coupled to the circuitry and the thermal sensor, the detector configured to:

measure a resistance of the thermal sensor over a specified number of medium revolutions for each heater adjustment; and detect head-medium contact using one of an amplitude of a harmonic of the thermal sensor signal and a summation of amplitudes of all frequency components at the specified frequency.

12. The apparatus of claim 11, wherein the detector comprises a frequency lock-in amplifier configured to lock to an amplitude of the sensor signal at the specified frequency.

13. The apparatus of claim 11, further comprising:
a processor configured to perform a Fast Fourier Transform (FFT) of thermal sensor data; and
a frequency lock-in amplifier configured to determine an amplitude from the FFT data at the specified frequency.

14. The apparatus of claim 11, wherein the harmonic is a first harmonic.

15. The apparatus of claim 11, wherein the harmonic is a second harmonic.

16. The apparatus of claim 11, wherein the detector is configured to detect head-medium contact using the summation of amplitudes of all frequency components at the specified frequency.

17. The apparatus of claim 11, wherein the specified frequency is defined in relation to a servo sampling rate.

18. The apparatus of claim 11, wherein the circuitry is configured to communicate the AC signal to the medium via a hub of a spindle motor configured to rotate the medium.

19. The apparatus of claim 11, wherein the circuitry is configured to communicate the AC signal to the slider substrate via the thermal sensor.

20. The apparatus of claim 11, wherein the thermal sensor comprises a dual-ended temperature coefficient of resistance (DETCR) sensor.

21. The apparatus of claim 11, wherein the detector is configured to detect head-medium contact across a plurality of zones of the medium including inner diameter (ID) zones, outer diameter (OD) zones, and middle diameter (MD) zones.

* * * * *